(12) United States Patent
Mohr

(10) Patent No.: US 6,989,749 B2
(45) Date of Patent: Jan. 24, 2006

(54) ELECTRONIC CHECK OUT SYSTEM

(75) Inventor: John Anthony Mohr, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 118 days.

(21) Appl. No.: 10/718,014

(22) Filed: Nov. 21, 2003

(65) Prior Publication Data

US 2005/0110638 A1 May 26, 2005

(51) Int. Cl.
G08B 13/14 (2006.01)

(52) U.S. Cl. .............. 340/572.1; 340/568.1; 340/5.92; 235/385; 705/28; 705/22

(58) Field of Classification Search .......... 340/572.1, 340/568.1, 5.92, 505, 568.8, 569, 570, 825.49; 705/22, 28; 235/385, 376, 375; 700/221–229
See application file for complete search history.

(56) References Cited

U.S. PATENT DOCUMENTS

| | | | | |
|---|---|---|---|---|
| 5,287,414 A | * | 2/1994 | Foster | 382/100 |
| 5,682,142 A | * | 10/1997 | Loosmore et al. | 340/572.1 |
| 5,886,634 A | * | 3/1999 | Muhme | 340/572.1 |
| 5,963,134 A | * | 10/1999 | Bowers et al. | 340/572.1 |
| 6,374,195 B1 | * | 4/2002 | Li et al. | 702/182 |
| 6,480,108 B2 | * | 11/2002 | McDonald | 340/505 |
| 6,509,829 B1 | * | 1/2003 | Tuttle | 340/10.1 |
| 6,693,538 B2 | * | 2/2004 | Maloney | 340/568.1 |
| 6,707,381 B1 | * | 3/2004 | Maloney | 340/568.1 |
| 6,774,811 B2 | * | 8/2004 | Kaufman et al. | 340/825.49 |
| 6,827,275 B2 | * | 12/2004 | Allen | 235/487 |
| 6,840,451 B2 | * | 1/2005 | Allen | 235/462.09 |
| 6,883,710 B2 | * | 4/2005 | Chung | 235/385 |
| 2003/0102970 A1 | * | 6/2003 | Creel et al. | 340/568.1 |
| 2003/0117281 A1 | * | 6/2003 | Sriharto et al. | 340/568.1 |
| 2004/0104652 A1 | * | 6/2004 | Holmes et al. | 312/348.3 |
| 2004/0150525 A1 | * | 8/2004 | Wilson et al. | 340/572.1 |

* cited by examiner

Primary Examiner—Jeffery Hofsass
Assistant Examiner—Eric Blount
(74) Attorney, Agent, or Firm—David S. Kalmbaugh

(57) ABSTRACT

An electronic check out system which utilizes radio frequency check out devices to check out tools from a centrally located tool storage facility and to identify the individual checking out the tool. The electronic check out system includes readers located a tool boxes and the central storage facility exit to identify the tool and the user of the tool as well as the time and date the tool was removed from the storage facility.

12 Claims, 8 Drawing Sheets

ELECTRONIC CHECK OUT SYSTEM

BACKGROUND OF THE INVENTION

1. Field of the Invention

The present invention relates generally to electronic check out systems which utilize radio frequency identification devices. More specifically, the present invention relates to an electronic check out system which utilizes radio frequency check out devices to check out tools from a central storage facility and to identify the individual checking out the tool.

2. Description of the Prior Art

Currently, radio frequency identification (RFID) devices/chips are being used for pet identification, toll collection on the highways and in automotive systems. Future applications include supply chain management and inventory tracking from high end clothing stores to factory floor assembly lines.

These RFID chips are far superior to conventional bar code technology which is subject to error due to line of sight requirements for bar code systems. RFID chips currently available from several manufactures including Philips Semiconductor and Texas Instrument are extremely fast and accurate with operating of approximately 13.56 MHz to approximately 2.46 GHz. The RFID chips also provide for read distances of about five feet to about ten feet.

Currently, large and medium size manufacturing and repair facilities utilizes a large number of portable tools and hand held tools for manufacturing and repair purposes. The tools are generally stored in one facility and are then checked out without an effective accountability system in place. Normally, the only requirement is the individual checking out the tool must sign for the tool. Unfortunately, the signature requirement is often ignored or the check out paper is misplaced or lost. When another individual needs the tool and there is no written identification as to who has the tool, the task of locating the tool becomes very difficult especially at a large manufacturing/industrial facility or military installation. Further, when the tool is uniquely suited to one application and there is no identification as to who has the tool manufacturing and/or repair at a facility can be severely impacted.

Accordingly, there is a need to provide a highly reliable and efficient system which provide information about who checked out a tool from a tool storage facility, the present location of the tool, the time and day the tool was checked and related information which will allow for an expeditious location of the tool. Ideally, the check out system should incorporate state of the art electronics including micro-chips which operate using radio frequency identification technology.

SUMMARY OF THE INVENTION

The present invention overcomes some of the difficulties of the past including those mentioned above in that comprises a very effective and efficient, yet relatively simple in design radio frequency identification technology based system for insuring that tools checked out from the tool boxes in a tool storage facility are easy to locate and that the present user is identified in an expeditious manner.

Each of the tools in a tool box have an RFID chip which operates as an identifier for the tool. When a user removes a tool, such as a screw driver or pliers from a tool box at a tool storage facility, the RFID chip within the tool is read by a reader at the tool box. In addition, the user's employee identification card, which includes an RFID chip is read by the reader. The reader then stores in its memory the tool's identification code, the date and time the tool was removed from the tool box and the identification code for the user. The reader also reads and then enters information into memory when a user, who is identified by the reader, returns the tool to the tool box.

A second reader is normally located at the exit of the tool storage facility within a military installation or a industrial facility. This reader also scans the tool and the employees identification card as the employee exits the tool storage facility. When the employee identification code does not match an employee identification code in an employee data base an alarm is sounded indicating an unauthorized removal of a tool from the tool storage facility.

DETAILED DESCRIPTION OF A PREFERRED EMBODIMENT

Figure 1:
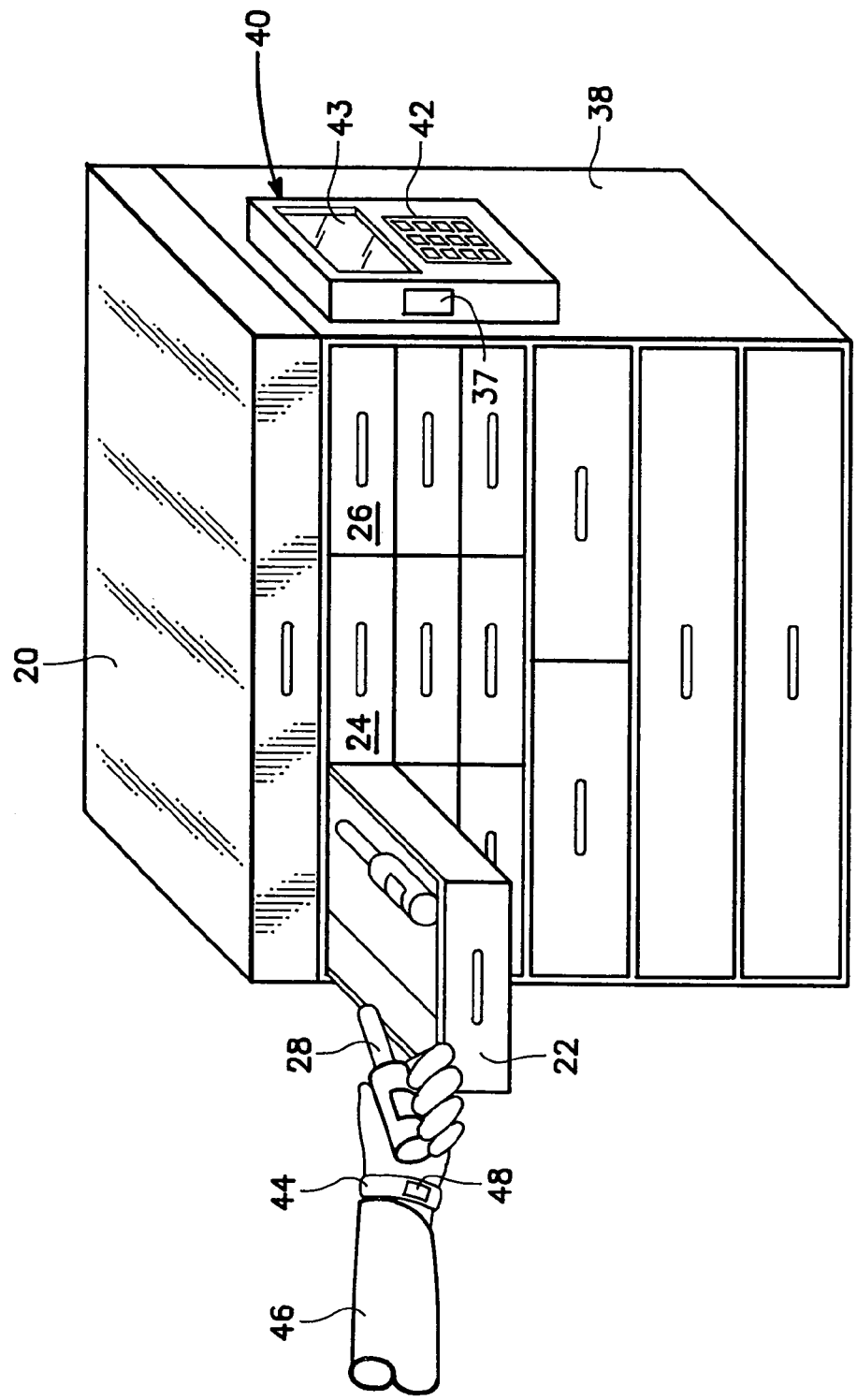
FIG. 1 illustrates a tool storage cabinet which stores tools having radio frequency identification chips imbedded within the tools.

Referring to FIGS, 1 and 2, there is shown a tool storage cabinet 20 which has a plurality of drawer 22, 24 and 26 for storing a variety of hand held tools which are utilized in a manufacturing/industrial plant or repair facility which may either civilian or military. The tools stored in the drawers 22, 24 and 26 of tool storage cabinet 20 include screw drivers 28 stored in drawer 22 and pliers 30 stored in drawer 24 and wrenches stored in drawer 26. Embedded within the handle of each tool is a RFID chip 32 which operates as an identifier for the tool.

Figure 2:
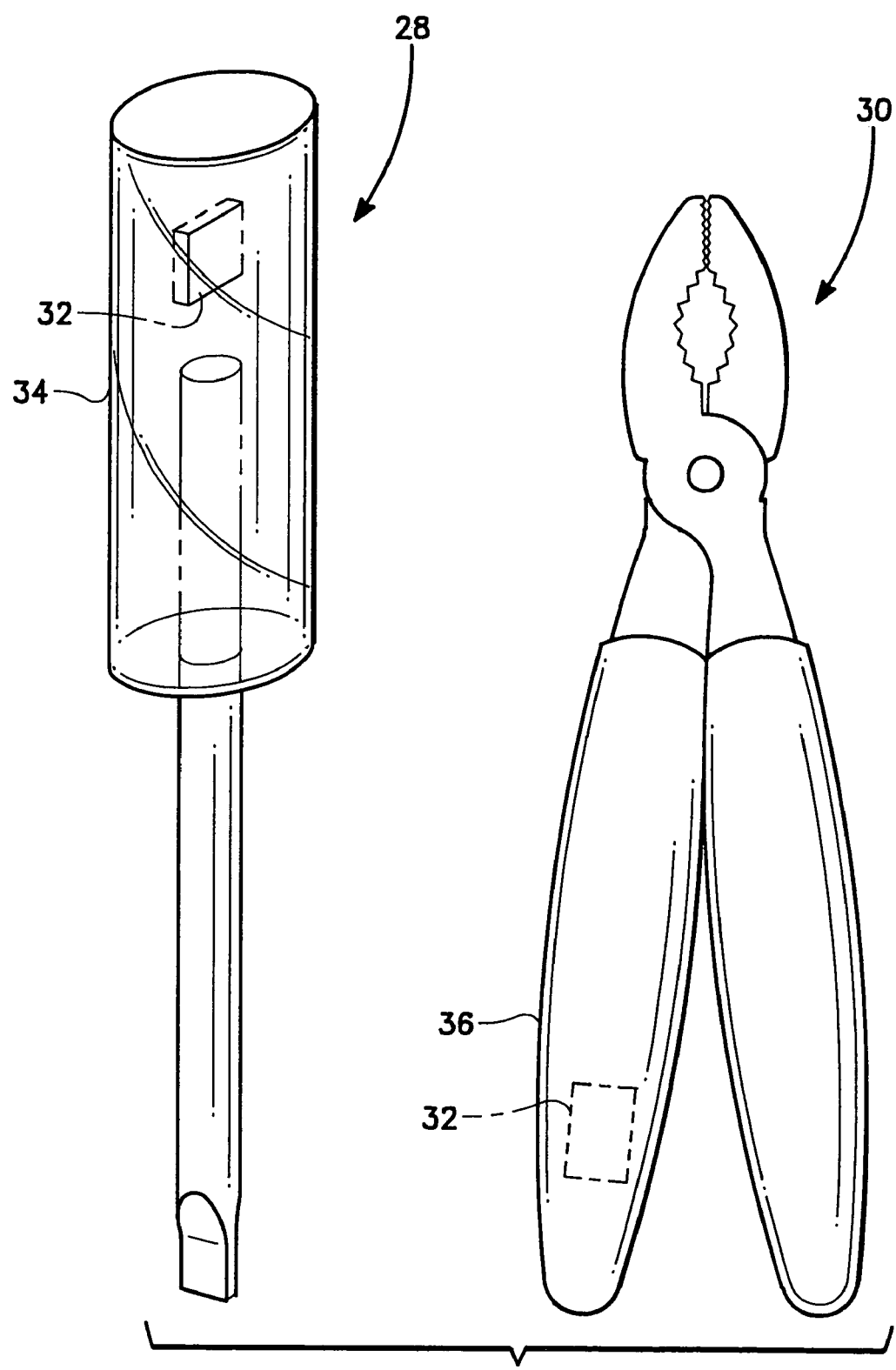
FIG. 2 illustrates pliers and a screw driver having RFID chips imbedded therein.

As shown in FIG. 2, the RFID chip 32 for screw driver 28 is embedded in handle 34, while the pliers 30 has an RFID chip 32 embedded handle 36. The RFID chips 32 are identification tags for each of the tools stored in tool storage cabinet 20. The RFID chip 32 provides for highly automated scanning that does not require line of sight and also allows for multiple items to be scanned simultaneously. Commercially available chips include the I.Code RFID chip manufactured by Philips Semiconductor of Eindhoven, The Netherlands. The Philips I.Code chips include a CMOS-based SLI line, which operates at 13.56 MHz and provides for read distances of up to five feet, and an HSL line that operates at 2.46 GHz and provides for read distances of up to ten feet. Texas Instruments of Plano, Tex. and Alien Technology Corporation of Morgan Hill, Calif. have also developed RFID chip which are commercially available.

Mounted on one side 38 of tool storage cabinet 20 is a reader 40 having a sensor element 37, a keypad 42 and a display 43. The sensor element 37 of reader 40 is adapted to receive RF (radio frequency) signals transmitted by the RFID chip 32 in screw driver 28 identify screw driver 28 as the tool being removed from tool storage cabinet 20. It should be noted that each tool in tool storage cabinet 20 has a unique digital identification code which allows reader 40 to identify the tool being removed from tool storage cabinet 20.

The user of screw driver 28 has a wrist band 44 on his arm 46 which includes an RFID chip 48 identifying the individual wearing the wrist band 44 with a unique digital identification code. After the user removes screw driver 28 from the tool storage cabinet 20, positioning the wrist band 44 and the screw driver 28 in proximity to the reader 40 allows reader 40 to read the RFID chips 32 and 48 which identifies the tool being removed from cabinet 20 and the user of the tool. Generally, when the user passes the reader 40, the reader 40 will sense and record the tool's identification and the user identification since the reader 40 can scan RFID chips at distances of up to ten feet.

In addition, the time and the day the tool was removed from the tool storage cabinet 20 is identified by reader 40. The information read into and retrievable from reader 40 includes the following:

"Screw Driver "abc" removed from cabinet "def" by employee "xyz " at 7:29 A.M. on Wednesday 31 May 2001."

If the user of screw driver 28 needs to enter additional information regarding screw driver 28 he enters this information via keypad 42. For example, when the user is traveling on business trip and intends to take screw driver 28 with him he can enters this information into reader 40 via keypad 42 so that a subsequent user can ascertain the availability of screw driver 28.

The keypad 42 also allows another individual who needs to use a tool, such as screw driver 28, to ascertain who has the tool and when the tool was removed from cabinet 20 by entering the tool's numerical identification code. Display 43 would then indicate that screw driver "abc" was removed from cabinet "def" by employee "xyz" at 7:29 A.M. on Wednesday 31 May 2001.

The user of a tool also has the tool identification read into reader 40 on tool storage cabinet 20 when a user is returning the tool to the tool storage cabinet 20. The date and time the tool is returned to cabinet 20 is recorded in the memory of reader 40.

Figure 3:
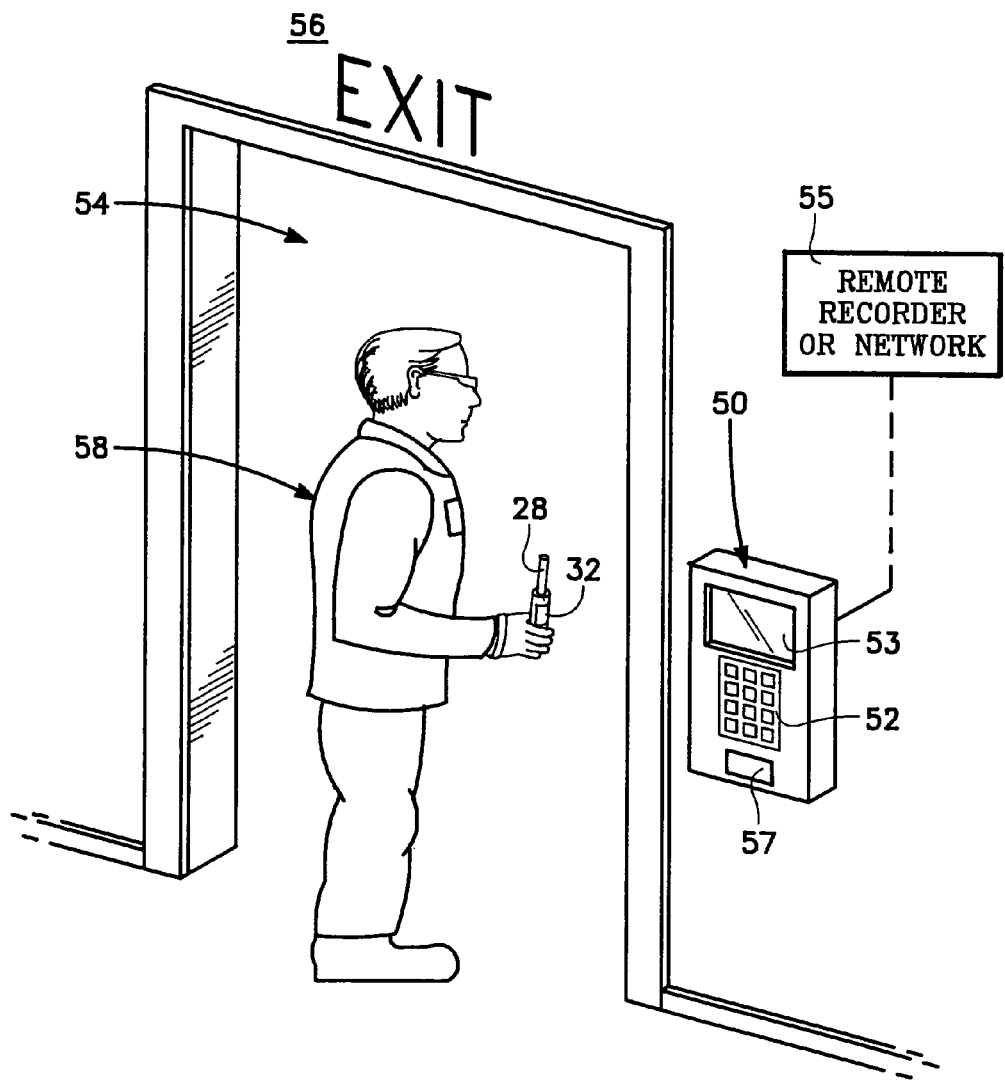
FIG. 3 illustrates the exit for a tool storage facility which includes a wall mounted reader at the exit for the tool storage facility.

Referring to FIG. 3, there is a reader 50 which has a sensor element 57, a keypad 52 and a display 53 located adjacent the exit 54 of the tool storage room 56. When the user 58 of tool 28 exist the tool storage room 56 via exit 54, the screw driver's identification tag/RFID chips 32 is read by the sensor element 57 if wall mounted reader 50. The information read into reader 50 is identical to the information read into reader 40 in that this information identification of the tool being removed from tool storage cabinet 20, the user 56 of the tool and the time and date the tool was removed from tool storage room 56. As depicted in FIG. 3, reader 50 is connected remote recorder or network 55. Remote recorder 55 records information received by reader 50 including the identification of tools being removed from the tool storage room 56 and the identification of the user removing the tools.

Figure 4:
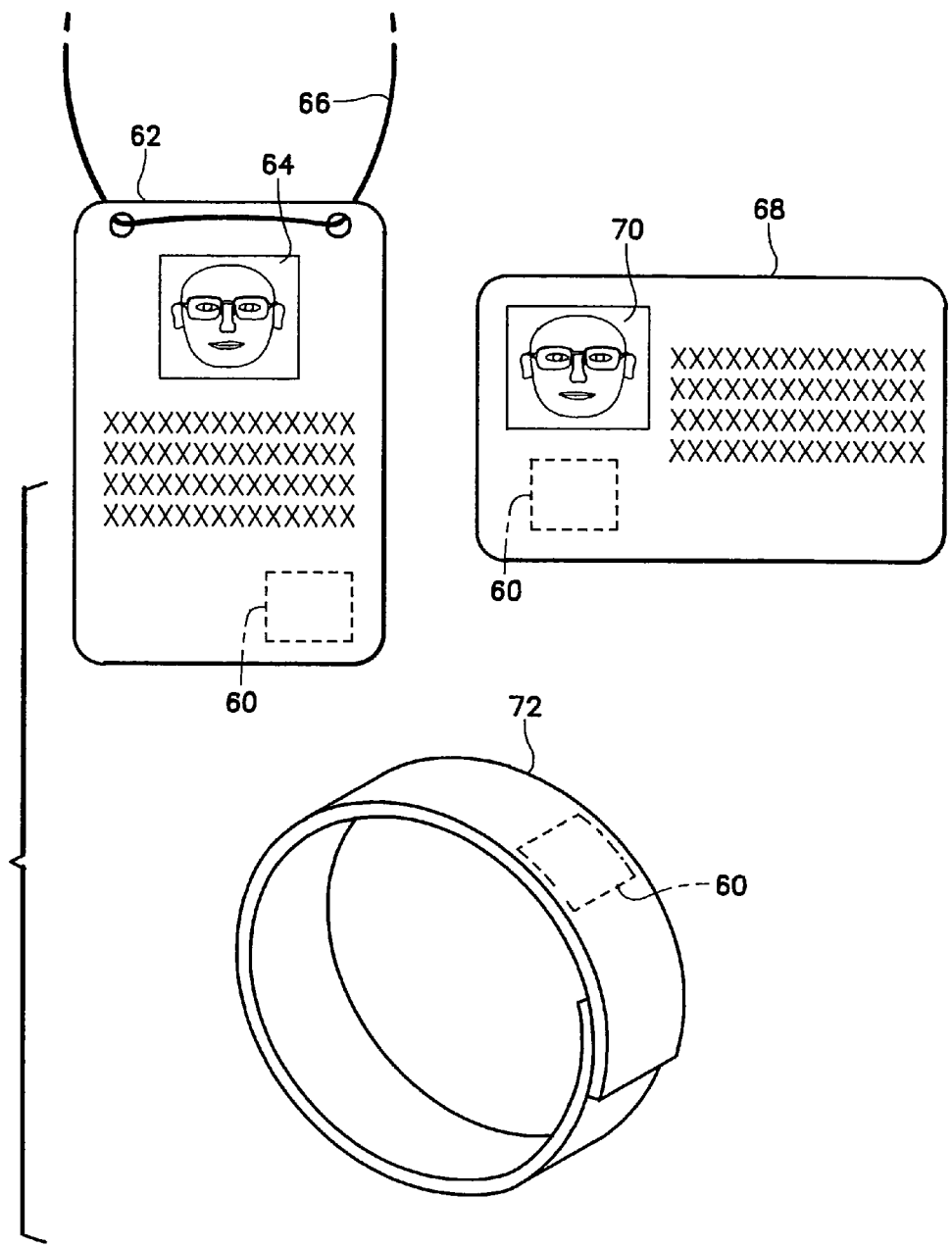
FIG. 4 illustrates a variety of identification devices which employees utilize when removing tools from tool storage cabinet and a tool storage room.

Referring to FIG. 4, there is shown a variety of identification devices which employees utilize when removing tools from tool storage cabinet 20 and tool storage room 56. Each of the identification devices includes an RFID chip 60 embedded within the device. The identification devices include an employee identification card 62 which has a picture 64 of the employee on the front of the identification card. A string or chain 66 affixed to the employee identification card 62 allows the identification card 62 to be worn around the neck of the employee. A second identification device is an employee identification card 68 which fits within a shirt pocket or a wallet. Employee identification card 68 also has a picture 70 of the employee on its front and an RFID chip 60 embedded within the card 68. A third identification device is a wrist band 72 which also has an RFID chip 60 embedded within the device.

Figure 5:
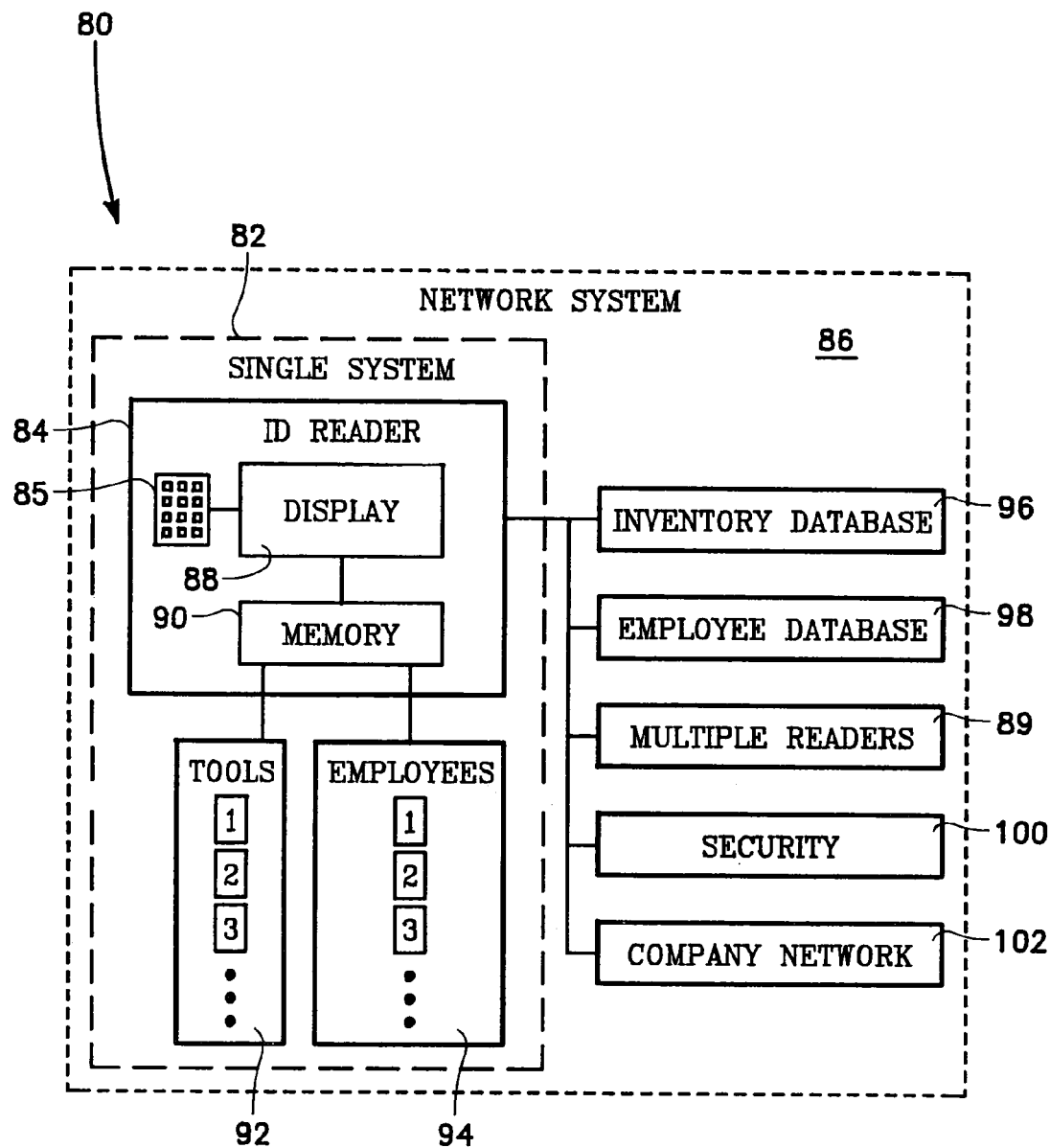
FIG. 5 depicts a block for the electrical components of the electronic check out system which comprises the present invention.

Referring to FIGS. 1, 3 and 5, FIG. 5 depicts a block for the electrical components of the electronic check out system, designated generally by the reference numeral 80, which comprises the present invention. The electronic check out system 80 comprises either a single/stand alone system 82 with one reader 84 or a network system 86 which has multiple readers 89.

System 82 has reader 84 which includes a keypad 85, a display 88 and a memory 90. Single system 82 generally comprises one reader such as reader 40 mounted tool storage cabinet 20. The memory 90 has the identification code for each of tools 92 stored in the tool storage cabinet and the identification code for the employee 94 authorized to use tools 92.

In the network system 86, there are multiple readers 89 identical to reader 48 which monitor tool status and usage throughout a large facility such as a manufacturing plant or a military installation. Also connected to the multiple readers 89 of network system 86 is a security computer 100, a tool inventory data base computer 96 which contains the identification code for each of the tools utilized at the facility, an employee database computer 98 which contains the identification code for each of the employees at the facility. At a military base where security is of the utmost importance, there is a need to account for all of the tools at the installation. Multiple readers 89 is also connected to the company computer network 102. This facilitates updating employee identification when, for example a new employee is hired or an employee retires.

Figure 6:
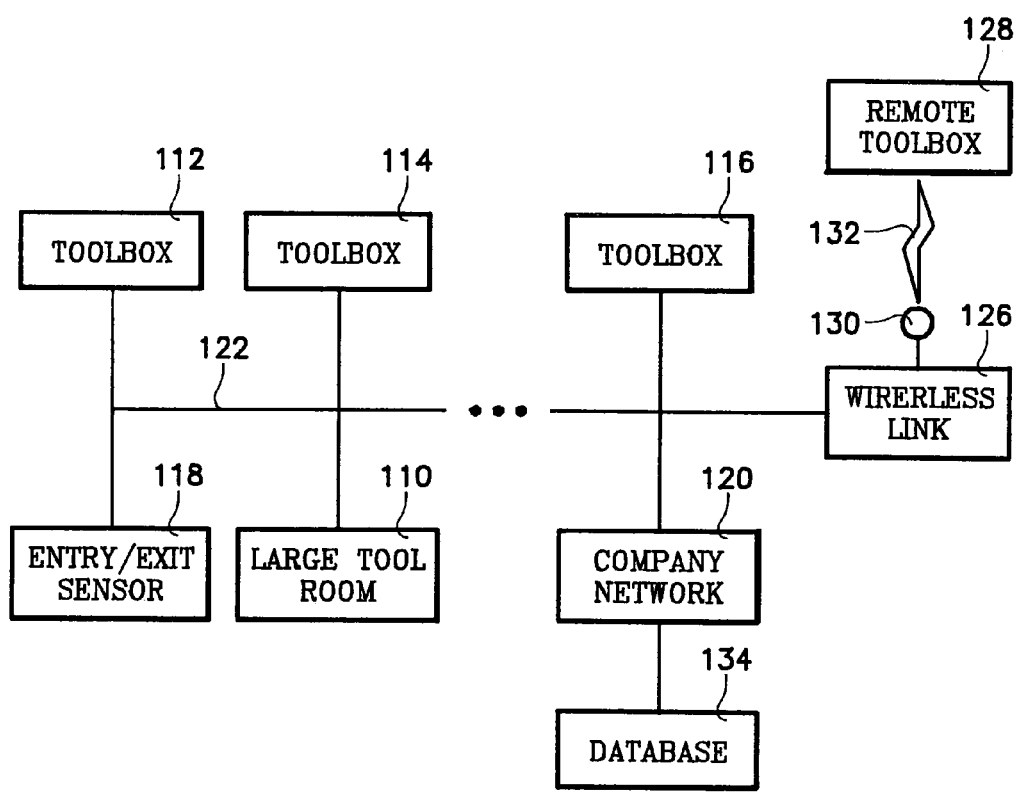
FIG. 6 depicts a configuration diagram of the various tool boxes, tool storage facilities and their associated readers at large manufacturing/industrial facility.

Referring to FIG. 6, there is shown a configuration diagram of the various tool boxes, tool storage facilities and their associated readers at large manufacturing facility. Generally, a large tool room 110 at an industrial facility has multiple tool boxes 112, 114 and 116 for storing a variety of tools such as screw drivers, pliers, wrenches, metal cutting saws, wire strippers and cutters, electric drills and bandsaws and specialty tools. Each tool box has a reader mounted on the tool box, identical to the reader 40 mounted on tool storage cabinet 20. The tool room 110 also has a reader/sensor 118 located at the exit for the tool room 110. While the readers for the electronic check out system are normally connected to one another and the company network 120 by electrical cables 122, a wireless link 126 may also be used to connect a remote tool box 128 to the company network 120. The wireless link includes antenna 130 for receiving tool identification, usage and location data from the remote tool box 128. Data from the remote tool box 128 is transmitted to antenna 130 via radio frequency carrier waves 132.

The company network 120 includes a centrally located tool and employee database 134 for the company.

Figure 7:
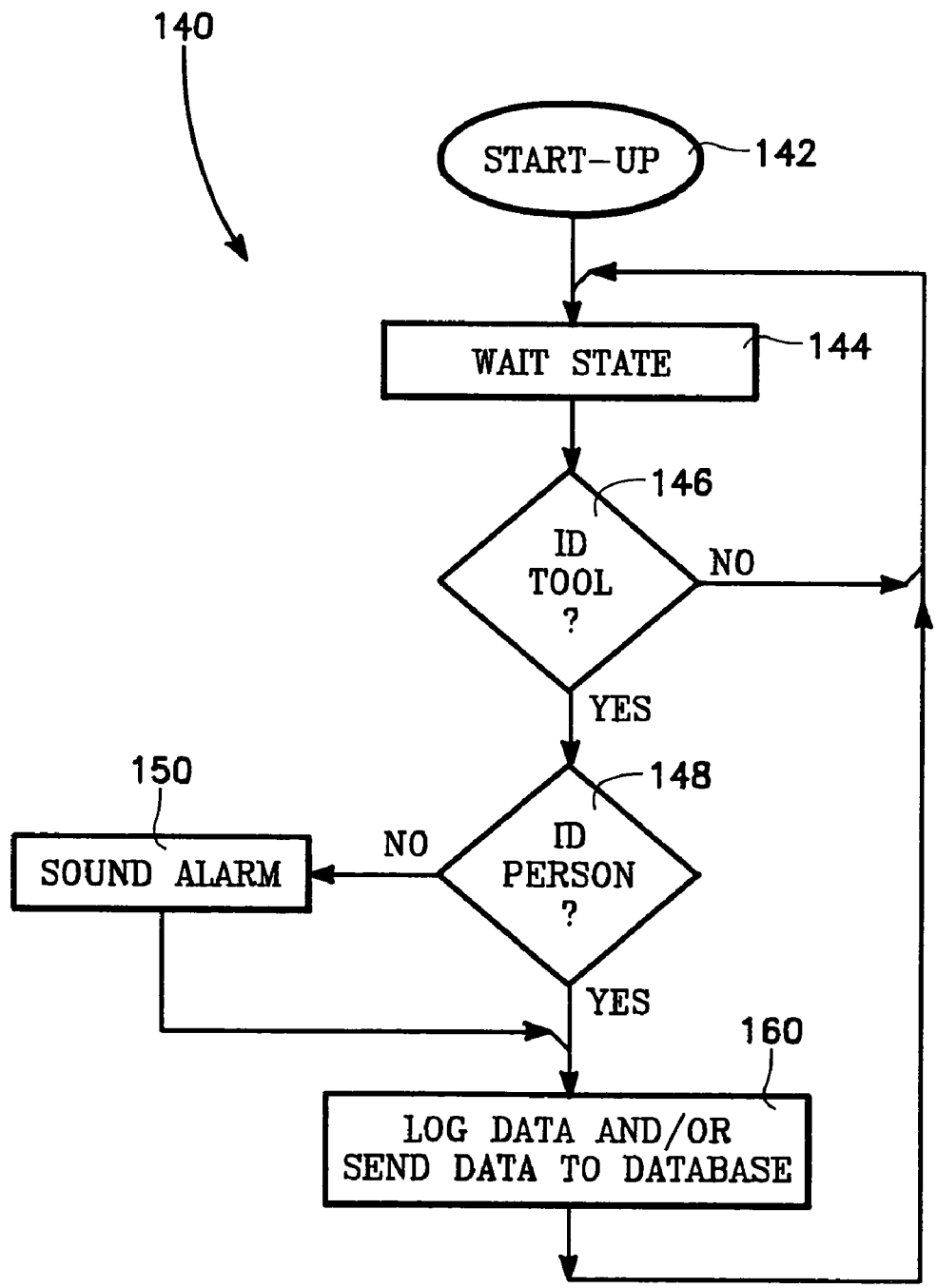
FIG. 7 is shown a flow chart for a computer software program utilized by a reader positioned adjacent the exit of the tool storage room.

Referring to FIGS. 1, 6 and 7, there is shown a flow chart 170 for the computer software program utilized by a reader, such as the reader 50, mounted on the wall adjacent the exit 54 of the tool storage room 56.

Program step 142 is the start for the software.

Program step 144 is a wait state which last until a tool is removed from a tool storage room 56. When a tool is removed from a tool storage room 56, the tool's identification code is read by reader 50 during program step 146. The employee who removed the tool from the tool storage room 56 has his/her identification code read during program step 148. Whenever an employee identification card is not read by reader 50 or an employee identification is not presented to reader 50, an alarm is activated (program step 150). An employee may enter information into reader 40 using keypad 42 to correct errors which occur (reader 40 does not correctly scan the employee identification card 62) or when the employee does not have his employee identification card 62 with him.

During program step 160, the tool identification and the employee identification as well as the date and time of removal are stored in memory of the reader 40 and/or forwarded to centrally located database 134 (FIG. 6).

Figure 8:
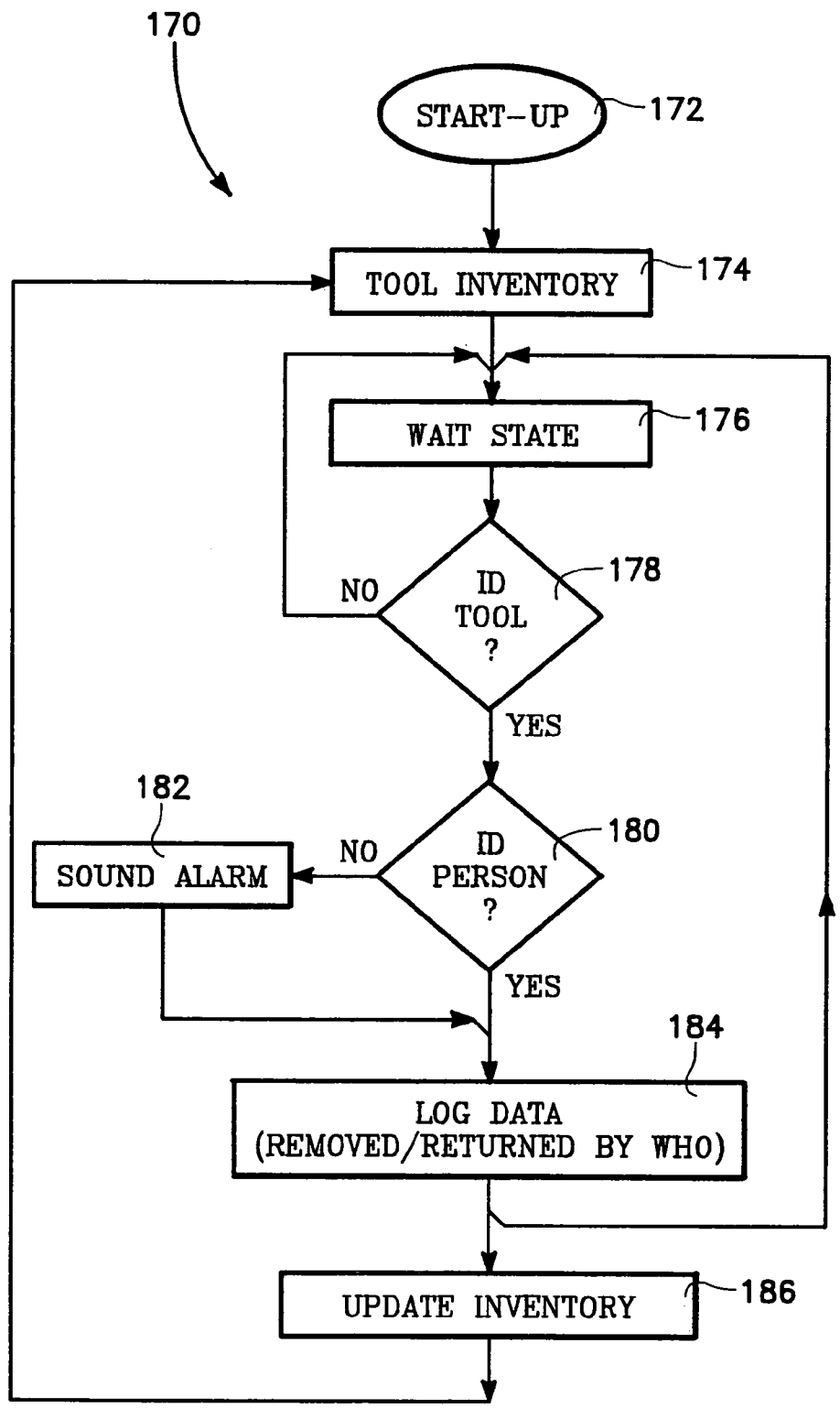
FIG. 8 is shown a flow chart for the computer software program utilized with a reader mounted on a tool storage cabinet used in a preferred embodiment of the present invention

Referring to FIGS. 1, 6 and 8, there is shown a flow chart 170 for the computer software program utilized with a reader such as the reader 40 mounted on tool storage cabinet 20 or any of the tool boxes 112, 114, 116 and 128 used in a preferred embodiment of the present invention. Program step 172 is the start for the software. Program step 174 provides for a tool inventory of tools currently in tool storage cabinet 20 and tools which have been from tool storage cabinet 20.

Program step 176 is a wait state which last until a tool is removed from a tool box. When a tool is removed from a tool box, the tool's identification code is read by a reader during program step 178. The employee who removed the tool from the tool box has his/her identification code read during program step 180.

To illustrate, when user 58 removes screw driver 28 from cabinet 20, the RFID chip 32 within screw driver 28 is read by reader 40 (program step 178) and the RFID chip 60 within the user's employee identification card 62 or 68 or wrist band 72 is also read by reader 40 (program step 180). Whenever an employee identification card is not read by reader 40 or an employee identification is not presented to reader 40, an alarm is activated (program step 182. Activation of an alarm may also occur when an employee identification code does not match a list of individuals authorized to use a tool or when employee identification code does not appear in the company or installation employee database. The keypad 42 on reader 40 allows the employee to enter his identification manually should an error occur during the scanning of the employee identification card or when the employee does have his identification card with him.

During program step 184, the tool identification and the employee identification as well as the date and time of removal are stored in memory of the reader 40. Further, during program step 184 information relating to the return of a tool to tool storage cabinet is stored in the memory of the reader 40.

During program step 186, an inventory update of the tools currently in tool storage cabinet 20 occurs.

From the foregoing, it may readily be seen the present invention comprises a new, unique and exceedingly useful electronic check out system which utilizes radio frequency check out devices to check out tools from a central storage facility which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An electronic checkout system comprising:

(a) a tool box located in a tool storage room;

(b) a plurality of tools stored in said tool box, each of said plurality of tools having a radio frequency identification (RFID) device imbedded therein, said radio frequency identification device for each of said tools operating as an identifier for each of said tools;

(c) a first RFID reader mounted on said tool box, said first RFID reader being adapted to read the radio frequency identification device for each of said tools to determine when each of said tools is being removed from said tool box by an authorized user, said first RFID reader reading and recording the radio frequency identification device for each of said tools which said authorized user removed from said tool box;

(d) a second RFID reader mounted on a wall adjacent an exit to said tool storage room, said second RFID reader being adapted to read the radio frequency identification device for each of said tools to determine when each of said tools is being removed from said tool storage room by said authorized user, said second RFID reader reading and recording the radio frequency identification device for each of said tools which has been removed from said tool storage room by said authorized user;

(e) an employee identification badge having a radio frequency identification device imbedded therein, said employee identification badge being worn by said authorized user to identify said authorized user as an individual authorized to remove each of said tools from said tool box and said tool storage room;

(f) a wrist band worn by said authorized user, said wrist band having a radio frequency identification device imbedded therein, said wrist band being worn by said authorized user to identify said authorized user as the individual authorized to remove each of said tools from said tool box and said tool storage room;

(g) said first RFID reader and said second RFID reader reading the radio frequency identification device of said employee identification badge and the radio frequency identification device of said wrist band to determine when the individual removing any one of said tools from said tool box and said tool storage room is said authorized user, wherein said second RFID reader includes an alarm which is activated whenever an unauthorized individual removes one tool of said plurality of tools from said tool storage room;

(h) a wireless link having an antenna, said wireless link being connected to a network which includes said second RFID reader adjacent the exit to said tool storage room;

(i) a remote tool box which transmits information via radio frequency signals to the antenna of said wireless link relating to portable tools removed from said remote tool box by said authorized user; and (j) a database connected to said network, said database including a list of employees authorized to remove said portable tools from said remote tool box and to remove said tools from said tool box located in said tool storage room.

2. The electronic checkout system of claim 1 wherein the radio frequency identification device for each of said tools and the radio frequency identification device for said employee identification badge operate at a frequency of 13.56 MHz and provides for read distances of approximately five feet.

3. The electronic checkout system of claim 1 wherein the radio frequency identification device for each of said tools and the radio frequency identification device for said employee identification badge operate at a frequency of 2.46 GHz and provides for read distances of approximately ten feet.

4. The electronic checkout system of claim 1 wherein said second RFID reader includes a recorder connected thereto, said recorder recording the radio frequency identification device for each of said tools which has been removed from said tool storage room by said authorized user.

5. The electronic checkout system of claim 1 wherein said first RFID reader has a sensor element, a keypad and a display wherein said sensor element is adapted to receive radio frequency signals transmitted by the radio frequency identification device for each of said tools, said keypad allows said authorized user to enter additional information into said first RFID reader relating to each of said tools said authorized user removes from said tool box, and said display allows said authorized user to read said additional information the authorized user entered into said first RFID reader.

6. The electronic checkout system of claim 1 wherein said second RFID reader has a sensor element, a keypad and a display wherein said sensor element is adapted to receive radio frequency signals transmitted by the radio frequency identification device for each of said tools, said keypad allows said authorized user to enter additional information into said second RFID reader relating to each of said tools said authorized user removes from said tool storage room, and said display allows said authorized user to read said additional information the authorized user entered into said second RFID reader.

7. The electronic checkout system of claim 1 wherein said plurality of tools stored in said tool box comprises screw drivers, pliers, wrenches, metal cutting saws, wire strippers wire cutters, electric drills, electric bandsaws, and specialty tools.

8. An electronic checkout system comprising:
  (a) a tool box located in a tool storage room;
  (b) a plurality of tools stored in said tool box, each of said plurality of tools having a tool identification device imbedded therein, said tool identification device for each of said tools providing a radio frequency signal containing a digital tool identification code which operates as an identifier for each of said tools;
  (c) a first RFID reader mounted on said tool box, said first RFID reader being adapted to receive and read the radio frequency signal provided by each of said tools to determine when each of said tools is being removed from said tool box by an authorized user, said first RFID reader reading the radio frequency signal provided by each of said tools and recording the digital tool identification code for each of said tools which said authorized user removed from said tool box;
  (d) a second RFID reader mounted on a wall adjacent an exit to said tool storage room, said second RFID reader being adapted to receive and read the radio frequency signal provided by each of said tools to determine when each of said tools is being removed from said tool storage room by said authorized user, said second RFID reader reading the radio frequency signal provided by each of said tools and recording the digital tool identification code for each of said tools which said authorized user removed from said tool storage room;
  (e) an employee identification badge having a first employee identification device imbedded therein, said employee identification badge being worn by said authorized user to identify said authorized user as an individual authorized to remove each of said tools from said tool box and said tool storage room, the first employee identification device providing a radio frequency signal containing a digital employee identification code for said authorized user;
  (f) a wrist band worn by said authorized user, said wrist band having a second employee identification device imbedded therein, said wrist band being worn by said authorized user to identify said authorized user as the individual authorized to remove each of said tools from said tool box and said tool storage room, the second employee identification device providing a radio frequency signal containing said digital employee identification code for said authorized user;
  (g) said first RFID reader and said second RFID reader receiving the radio frequency signal provided by said first employee identification device and the radio frequency signal provided by said second employee identification device, said first RFID reader and said second RFID reader reading the digital employee identification code contained within the radio frequency signal provided by said first employee identification device and the radio frequency signal provided by said second employee identification device to determine when the individual removing any one of said tools from said tool box and said tool storage room is said authorized user; and (g) said tool identification device for each of said tools, said first employee identification device for said employee identification badge and said second employee identification device for said wrist band each comprising a radio frequency identification device selected from the group of radio frequency identification devices consisting of (a) a first RFID device operating at a frequency of 13.56 MHz and providing for read distances of approximately five feet, and (b) a second RFID device operating at a frequency of 2.46 GHz and providing for read distances of approximately ten feet;
  (h) a wireless link having an antenna, said wireless link being connected to a network which includes said second RFID reader adjacent the exit to said tool storage room;
  (i) a remote tool box which transmits information via radio frequency signals to the antenna of said wireless link relating to portable tools removed from said remote tool box by said authorized user; and (j) a database connected to said network, said database including a list of employees authorized to remove said portable tools from said remote tool box and to remove said tools from said tool box located in said tool storage room.

9. The electronic checkout system of claim 8 wherein said second RFID reader includes a recorder connected thereto, said recorder recording the radio frequency identification device for each of said tools which has been removed from said tool storage room by said authorized user.

10. The electronic checkout system of claim 8 wherein said first RFID reader has a sensor element, a keypad and a display wherein said sensor element is adapted to receive radio frequency signals transmitted by the radio frequency identification device for each of said tools, said keypad allows said authorized user to enter additional information into said first RFID reader relating to each of said tools said authorized user removes from said tool box, and said display allows said authorized user to read said additional information the authorized user entered into said first RFID reader.

11. The electronic checkout system of claim 8 wherein said plurality of tools stored in said tool box comprises screw drivers, pliers, wrenches, metal cutting saws, wire strippers wire cutters, electric drills, electric bandsaws, and specialty tools.

12. An electronic checkout system comprising:

(a) a plurality of tool boxes located in a tool storage room;

(b) a plurality of tools stored in said plurality tool boxes, each of said plurality of tools having a tool identification device imbedded therein, said tool identification device for each of said tools providing a radio frequency signal containing a digital tool identification code which operates as an identifier for each of said tools;

(c) a plurality of tool box RFID readers, one of said plurality of tool box RFID readers mounted on each of said tool boxes, said plurality of tool box RFID readers being adapted to receive and read the radio frequency signal provided by each of said tools to determine when each of said tools is being removed from one of said tool boxes by an authorized user, said plurality of tool box RFID readers reading the radio frequency signal provided by each of said tools and recording the digital tool identification code for each of said tools which said authorized user removed from one of said tool boxes;

(d) a wall mounted RFID reader mounted on a wall adjacent an exit to said tool storage room, said wall mounted RFID reader being adapted to receive and read the radio frequency signal provided by each of said tools to determine when each of said tools is being removed from said tool storage room by said authorized user, said wall mounted RFID reader reading the radio frequency signal provided by each of said tools and recording the digital tool identification code for each of said tools which said authorized user removed from said tool storage room;

(e) an employee identification badge having a first employee identification device imbedded therein, said employee identification badge being worn by said authorized user to identify said authorized user as an individual authorized to remove each of said tools from said tool boxes and said tool storage room, the first employee identification device providing a radio frequency signal containing a digital employee identification code for said authorized user;

(f) a wrist band worn by said authorized user, said wrist band having a second employee identification device imbedded therein, said wrist band being worn by said authorized user to identify said authorized user as the individual authorized to remove each of said tools from said tool boxes and said tool storage room, the second employee identification device providing a radio frequency signal containing said digital employee identification code for said authorized user;

(g) said plurality of tool box RFID readers and said wall mounted RFID reader receiving the radio frequency signal provided by said first employee identification device and the radio frequency signal provided by said second employee identification device, said first RFID reader and said second RFID reader reading the digital employee identification code contained within the radio frequency signal provided by said first employee identification device and the radio frequency signal provided by said second employee identification device to determine when the individual removing any one of said tools from said tool boxes and said tool storage room is said authorized user; and (h) a wireless link having an antenna, said wireless link being connected to a network which includes said second RFID reader adjacent the exit to said tool storage room;

(i) a remote tool box which transmits information via radio frequency signals to the antenna of said wireless link relating to portable tools removed from said remote tool box by said authorized user; and (j) a database connected to said network, said database including a list of employees authorized to remove said portable tools from said remote tool box and to remove said tools from said tool boxes located in said tool storage room.

* * * * *